United States Patent
Fish

(10) Patent No.: US 12,253,197 B2
(45) Date of Patent: Mar. 18, 2025

(54) BI-DIRECTIONAL BUTTONHEAD TIES

(71) Applicant: HellermannTyton Corporation, Milwaukee, WI (US)

(72) Inventor: Ethan Fish, Milwaukee, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 18/330,836

(22) Filed: Jun. 7, 2023

(65) Prior Publication Data

US 2023/0349491 A1      Nov. 2, 2023

Related U.S. Application Data

(60) Provisional application No. 63/366,760, filed on Jun. 21, 2022.

(51) Int. Cl.
*F16L 3/13* (2006.01)
*B65D 63/10* (2006.01)

(52) U.S. Cl.
CPC .......... *F16L 3/13* (2013.01); *B65D 63/1072* (2013.01)

(58) Field of Classification Search
CPC .......... B65D 63/1072; B65D 2563/107; B65D 63/1063; F16L 3/13; F16L 3/2336
See application file for complete search history.

(56) References Cited

U.S. PATENT DOCUMENTS

| | | |
|---|---|---|
| 3,258,819 A | 7/1966 | Weckesser |
| 3,537,146 A | 11/1970 | Caveney |
| 3,872,547 A | 3/1975 | Caveney et al. |
| 3,900,922 A | 8/1975 | McCormick |
| 3,908,233 A | 9/1975 | Caveney et al. |
| 3,965,538 A | 6/1976 | Caveney et al. |

(Continued)

FOREIGN PATENT DOCUMENTS

| | | |
|---|---|---|
| CH | 544523 | 1/1974 |
| CN | 1623861 | 6/2005 |

(Continued)

OTHER PUBLICATIONS

"Foreign Office Action", CN Application No. 202210556584.5, Mar. 8, 2024, 12 pages.

(Continued)

*Primary Examiner* — Robert Sandy
(74) *Attorney, Agent, or Firm* — Colby Nipper PLLC

(57) ABSTRACT

This document describes techniques and apparatuses, which include improved bi-directional buttonhead ties, techniques for manufacturing bi-directional buttonhead ties, and techniques for using bi-directional buttonhead ties. In aspects, a bi-directional buttonhead tie is configured for securing an elongated member to a support structure and includes a tie strap and a locking head. The tie strap includes a first side and a second side. The locking head includes an outer side opposite a panel side, the tie strap extending from the panel side of the locking head, the locking head further including a first slot extending through the locking head from the outer side to the panel side, the first slot configured to receive a portion of the tie strap therethrough, and a second slot extending through the locking head from the outer side to the panel side, the second slot configured to receive a portion of the tie strap therethrough.

20 Claims, 5 Drawing Sheets

(56) References Cited

U.S. PATENT DOCUMENTS

| | | | |
|---|---|---|---|
| 4,009,509 A | 3/1977 | McCormick | |
| 4,038,726 A | 8/1977 | Takabayashi | |
| 4,236,280 A * | 12/1980 | Kreiseder | B65D 63/1072 24/301 |
| 4,269,379 A | 5/1981 | McCormick | |
| 4,371,011 A | 2/1983 | Hidassy | |
| 4,413,380 A | 11/1983 | Suzuki | |
| 4,490,887 A | 1/1985 | Sarton et al. | |
| 4,557,023 A | 12/1985 | Six et al. | |
| 4,735,387 A | 4/1988 | Hirano et al. | |
| 4,805,856 A | 2/1989 | Nicoli et al. | |
| 5,193,250 A | 3/1993 | Caveney | |
| 5,205,328 A | 4/1993 | Johnson | |
| 5,267,373 A | 12/1993 | Chisek | |
| 5,386,615 A | 2/1995 | Bernard | |
| 5,669,253 A | 9/1997 | Higgins | |
| 5,759,004 A | 6/1998 | Kuffel | |
| 5,826,308 A * | 10/1998 | Chang | B65D 63/14 248/74.3 |
| 5,966,781 A | 10/1999 | Geiger | |
| 6,070,304 A * | 6/2000 | Lii | F16L 3/233 24/17 AP |
| 6,119,314 A * | 9/2000 | Freed | B65D 63/1063 24/17 AP |
| 6,279,620 B1 | 8/2001 | Eason et al. | |
| 6,347,435 B1 | 2/2002 | Davignon et al. | |
| 6,530,126 B2 | 3/2003 | Caveney | |
| 6,533,226 B2 | 3/2003 | Geiger | |
| 6,807,714 B2 * | 10/2004 | O'Young | B65D 63/1072 24/16 PB |
| 6,898,825 B1 | 5/2005 | Charest | |
| 7,143,480 B2 | 12/2006 | Igarashi | |
| 7,278,188 B2 | 10/2007 | Kurmis | |
| 7,661,633 B2 | 2/2010 | Igarashi et al. | |
| 8,281,461 B2 | 10/2012 | Geiger | |
| 10,479,574 B2 * | 11/2019 | Vorhis | B65D 63/1081 |
| 11,027,902 B2 | 6/2021 | Geiger et al. | |
| 11,097,879 B1 | 8/2021 | Chen et al. | |
| 11,738,922 B2 | 8/2023 | Geiger et al. | |
| 11,952,186 B2 | 4/2024 | Geiger et al. | |
| 2002/0084388 A1 | 7/2002 | Geiger | |
| 2007/0023586 A1 | 2/2007 | Geiger | |
| 2007/0175001 A1 | 8/2007 | Tomory et al. | |
| 2007/0234524 A1 * | 10/2007 | Witt | B65D 63/14 24/16 PB |
| 2007/0251062 A1 | 11/2007 | Saitoh et al. | |
| 2008/0250609 A1 | 10/2008 | Franks | |
| 2010/0306967 A1 | 12/2010 | Geiger | |
| 2014/0013552 A1 | 1/2014 | Liang et al. | |
| 2015/0321814 A1 | 11/2015 | Rodrigues Pereira | |
| 2016/0001943 A1 | 1/2016 | Harsley | |
| 2016/0280405 A1 | 9/2016 | Thieme et al. | |
| 2018/0080580 A1 | 3/2018 | Coulter | |
| 2019/0106231 A1 | 4/2019 | Schwinn et al. | |
| 2019/0144149 A1 | 5/2019 | Dohrmann et al. | |
| 2019/0248521 A1 | 8/2019 | Hillegonds et al. | |
| 2020/0156224 A1 | 5/2020 | Suenaga | |
| 2020/0391891 A1 | 12/2020 | Xu | |
| 2020/0391916 A1 | 12/2020 | Geiger et al. | |
| 2022/0402667 A1 | 12/2022 | Geiger et al. | |
| 2023/0079482 A1 | 3/2023 | Poupinet et al. | |
| 2023/0126004 A1 | 4/2023 | Fukuda et al. | |
| 2023/0348159 A1 | 11/2023 | Geiger et al. | |
| 2024/0158148 A1 | 5/2024 | Poupinet et al. | |

FOREIGN PATENT DOCUMENTS

| | | |
|---|---|---|
| CN | 1910087 A | 2/2007 |
| CN | 101180488 | 5/2008 |
| CN | 201109575 Y | 9/2008 |
| CN | 101541594 | 9/2009 |
| CN | 102123920 | 7/2011 |
| CN | 102245913 | 11/2011 |
| CN | 102398726 | 4/2012 |
| CN | 102398727 | 4/2012 |
| CN | 202670383 | 1/2013 |
| CN | 203186799 | 9/2013 |
| CN | 203237579 | 10/2013 |
| CN | 203924200 | 11/2014 |
| CN | 104736450 | 6/2015 |
| CN | 204815098 | 12/2015 |
| CN | 108625819 | 10/2018 |
| CN | 110127102 | 8/2019 |
| CN | 209729760 | 12/2019 |
| CN | 112078963 A | 12/2020 |
| DE | 2612030 | 1/1977 |
| DE | 69313329 | 3/1998 |
| DE | 202004018890 | 2/2005 |
| EP | 2141397 | 1/2020 |
| EP | 3712076 | 9/2020 |
| EP | 3747781 | 12/2020 |
| FR | 2282062 | 3/1976 |
| FR | 2429921 | 1/1980 |
| GB | 1519233 | 7/1978 |
| KR | 200431100 | 11/2006 |
| KR | 20090012657 | 12/2009 |
| KR | 20110130425 | 12/2011 |
| KR | 20150064060 | 6/2015 |
| WO | 9713946 | 4/1997 |
| WO | 2005099402 | 10/2005 |
| WO | 2015008061 | 1/2015 |
| WO | 2019051624 | 3/2019 |

OTHER PUBLICATIONS

"Notice of Allowance", U.S. Appl. No. 18/350,443, filed Feb. 2, 2024, 7 pages.

"Advisory Action", U.S. Appl. No. 17/931,452, filed Sep. 12, 2023, 6 pages.

"Extended European Search Report", EP Application No. 23179733. 3, Nov. 13, 2023, 7 pages.

"Non-Final Office Action", U.S. Appl. No. 17/931,452, filed Oct. 26, 2023, 9 pages.

"Extended European Search Report", EP Application No. 22195180. 9, Jan. 30, 2023, 7 pages.

"Extended European Search Report", EP Application No. 21306256. 5, Feb. 9, 2022, 7 pages.

"Extended European Search Report", EP Application No. 22173084. 9, Oct. 28, 202, 6 pages.

"Extended European Search Report", EP Application No. 20177362. 9, Nov. 20, 2020, 6 pages.

"Final Office Action", U.S. Appl. No. 12/478,863, filed Apr. 11, 2012, 10 pages.

"Foreign Office Action", KR Application No. 10-2020-0067440, Jan. 5, 2022, 21 pages.

"Foreign Office Action", JP Application No. 2020-098218, May 18, 2021, 15 pages.

"Foreign Office Action", CN Application No. 202010505104.3, Nov. 4, 2021, 21 pages.

"Non-Final Office Action", U.S. Appl. No. 12/478,863, filed Jul. 18, 2021, 9 pages.

"Notice of Allowance", U.S. Appl. No. 16/876,722, filed Feb. 23, 2021, 7 pages.

"Notice of Allowance", U.S. Appl. No. 17/659,767, filed Mar. 6, 2023, 7 pages.

"Notice of Allowance", U.S. Appl. No. 17/659,767, filed Apr. 11, 2023, 7 pages.

"Notice of Allowance", U.S. Appl. No. 12/478,863, filed Aug. 20, 2012, 8 pages.

"Restriction Requirement", U.S. Appl. No. 12/478,863, filed May 17, 2021, 7 pages.

"Restriction Requirement", U.S. Appl. No. 18/048,189, filed Jun. 5, 2024, 6 pages.

"Restriction Requirement", U.S. Appl. No. 18/423,032, filed Aug. 2, 2024, 6 pages.

"Extended European Search Report", EP Application No. 22202483. 8, Apr. 25, 2023, 7 pages.

"Undated Button Head Tie Product", Apr. 24, 2013, 3 pages.

(56) References Cited

OTHER PUBLICATIONS

"Non-Final Office Action", U.S. Appl. No. 18/048,189, filed Nov. 7, 2024, 9 pages.
"Non-Final Office Action", U.S. Appl. No. 18/423,032, filed Sep. 11, 2024, 10 pages.

* cited by examiner

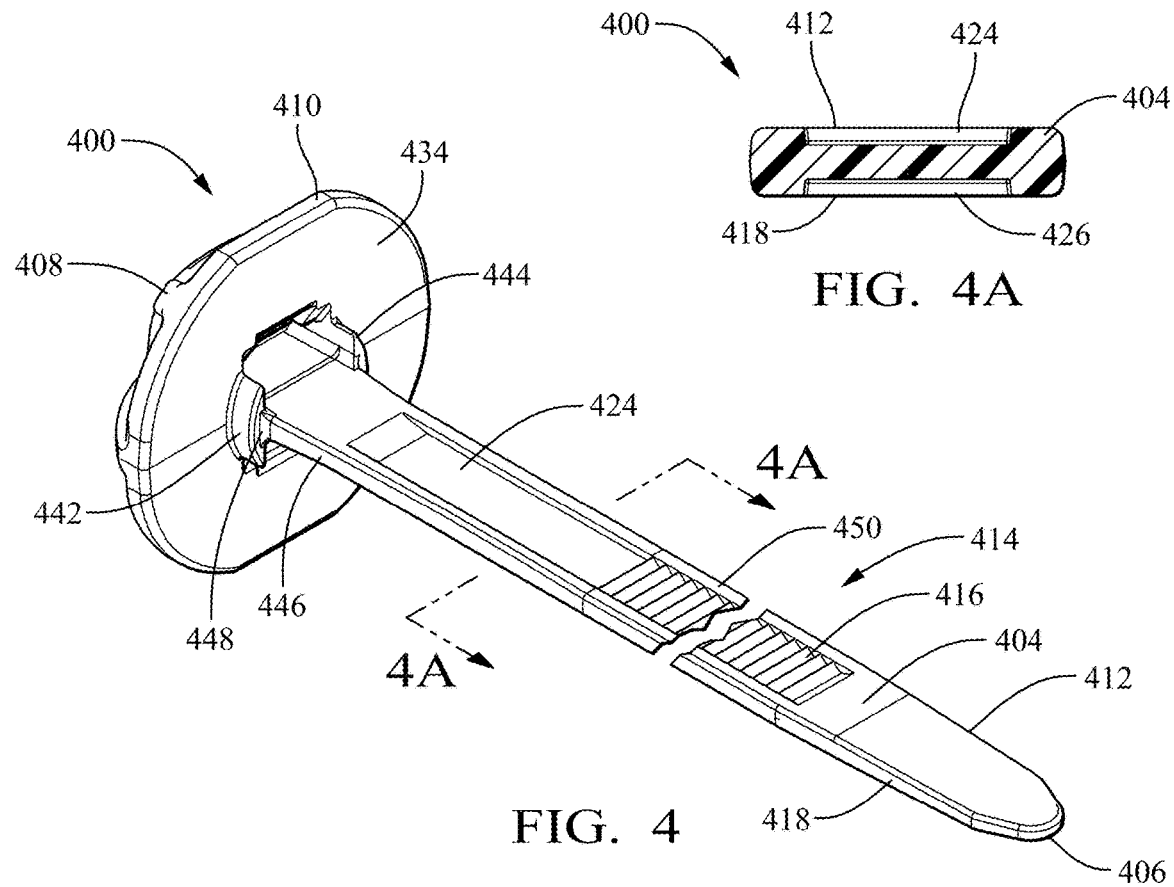
FIG. 4A
FIG. 4
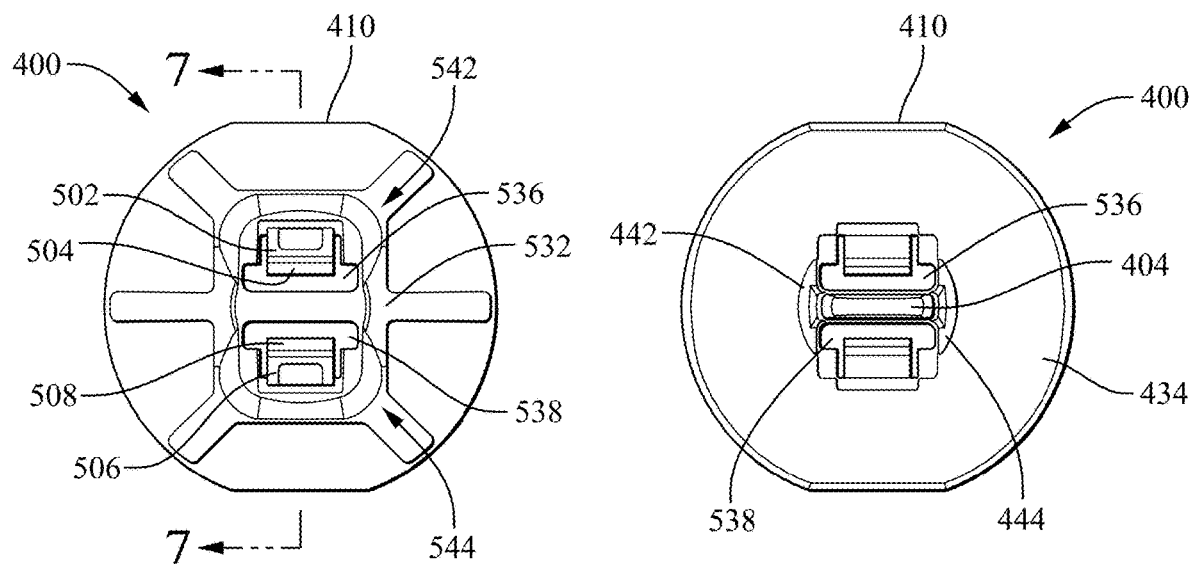
FIG. 5
FIG. 6

BI-DIRECTIONAL BUTTONHEAD TIES

INCORPORATION BY REFERENCE

This application claims priority to U.S. Provisional Application No. 63/336,760, filed Jun. 21, 2022, the disclosure of which is incorporated by reference in its entirety.

BACKGROUND

A buttonhead tie, also referred to as a chassis tie, is a cable tie design that allows elongated articles (e.g., wires, harnesses, hoses, tubes, cables, and the like) to be secured in a bundle and attached to a support structure (e.g., a vehicle chassis, a vehicle panel, a vehicle frame rail, a firewall, a fender, a body panel, a bracket, or the like). A buttonhead tie includes a locking head (e.g., a "buttonhead") and a tie strap (e.g., an elongated strap). The locking head of the buttonhead tie is sized relative to a hole defined through the support structure to keep the head from being pulled through the hole.

One type of buttonhead tie, referred to as a "locking-wedge block buttonhead tie," utilizes a locking head and a tie strap that are separately molded. In this type, the tie strap is molded with a tail finger grip on one end (the "tail end") and a wedge-shaped pawl, or wedge, on the other end. The tail end is configured for insertion through an aperture defined through the locking head and through a hole defined in the support structure. A portion of the tie strap is then looped around the bundle, and the tail end is passed back through the support structure hole and back through the aperture defined in the locking head. When both the wedge and the tie strap are passed through the aperture defined through the locking head and then driven into the locking head, the wedge locks into the locking head. Disadvantageously, this approach (1) requires multiple molds, increasing cost; (2) may require automation equipment and/or additional labor to loosely assemble the locking head and tie strap together during product packaging, increasing cost; and (3) should the locking head and tie strap separate during shipping and handling, may require additional handling by a customer's employees (e.g., installers), potentially resulting in an undesirable rework cost. Further disadvantageously, in aspects, the tie strap may be loosely assembled into the locking head to allow for a low strap insertion force for the installers and may allow a low-tensioned strap installed around the bundle to be backed out of the locking head to release the tie strap. This may require the installer to be knowledgeable on applying proper tension of the tie strap for securing bundles, which may add some complexity to the installation. Further, such a method of retention may require a certain higher amount of minimum strap tension to be applied around the bundle to properly seat the tie strap into the locking head (e.g., pawl assembly has teeth that engage serrations on the strap).

In another aspect, the tie strap and locking head are molded together, and serrations are provided on one side of the tie strap. The tie strap includes a tail end that is configured for insertion through a hole defined in the support structure. The tie strap is then looped around the bundle, the tail end is passed back through the support structure hole, and the tail end is inserted through a passageway defined in the locking head. This passageway includes a pawl configured to lockingly engage the serrated teeth on the tie strap to attach the bundle to the support structure. Disadvantageously, this approach requires the locking head tie to be oriented prior to assembly in order for the tie strap to be looped/installed around the bundle in a single direction because the serrations are only on one side of the tie strap.

SUMMARY

This document describes techniques and apparatuses for improved bi-directional buttonhead ties. In general, a first aspect of the present disclosure relates to a bi-directional buttonhead tie configured for securing an elongated member to a support structure.

In some aspects, the techniques and apparatuses described herein relate to a bi-directional buttonhead tie including: a tie strap, the tie strap including a first side with a first strap lock portion and a second side with a second strap lock portion; and a locking head, the locking head including an outer side opposite a panel side, the tie strap extending from the panel side of the locking head, the locking head further including: a first slot that extends through the locking head from the outer side to the panel side, the first slot configured to receive a portion of the tie strap therethrough; a second slot that extends through the locking head from the outer side to the panel side, the second slot configured to receive the portion of the tie strap therethrough; a first slot lock portion disposed within the first slot, the first slot lock portion configured to engage at least one of the first strap lock portion or the second strap lock portion when the portion of the tie strap is received within the first slot; and a second slot lock portion disposed within the second slot, the second slot lock portion configured to engage at least one of the first strap lock portion or the second strap lock portion when the portion of the tie strap is received within the second slot.

In some aspects, the techniques and apparatuses described herein relate to a bi-directional buttonhead tie, wherein the first slot lock portion includes a first pawl, the second slot lock portion includes a second pawl, the first strap lock portion includes a plurality of first serrations, and the second strap lock portion includes a plurality of second serrations.

In some aspects, the techniques and apparatuses described herein relate to a bi-directional buttonhead tie, wherein the first pawl includes first pawl teeth configured to engage at least one of the plurality of first or second serrations on the tie strap, and wherein the second pawl includes second pawl teeth configured to engage at least one of the plurality of first or second serrations on the tie strap.

In some aspects, the techniques and apparatuses described herein relate to a bi-directional buttonhead tie, wherein the first pawl is positioned internally to the locking head and the second pawl is positioned internally to the locking head.

In some aspects, the techniques and apparatuses described herein relate to a bi-directional buttonhead tie, wherein the tie strap is integrally formed with the locking head, and wherein the tie strap and the locking head are formed of a polymeric material.

In some aspects, the techniques and apparatuses described herein relate to a bi-directional buttonhead tie, wherein the panel side of the locking head defines a head plane, and wherein the tie strap extends from the panel side of the locking head perpendicular to the head plane.

In some aspects, the techniques and apparatuses described herein relate to a bi-directional buttonhead tie, wherein the tie strap extends from the panel side of the locking head in a tie strap plane, the first slot extends along a first slot plane, the second slot extends along a second slot plane, the first slot plane is parallel to the second slot plane, and the first and second slot planes are parallel to the tie strap plane.

In some aspects, the techniques and apparatuses described herein relate to a bi-directional buttonhead tie, wherein the first slot includes a first proximal side proximal to a centerline of the locking head and a first distal side spaced apart from the first proximal side and the centerline, and wherein the second slot includes a second proximal side proximal to the centerline of the locking head and a second distal side spaced apart from the second proximal side and the centerline.

In some aspects, the techniques and apparatuses described herein relate to a bi-directional buttonhead tie, wherein the first slot lock portion includes a first pawl, the second slot lock portion includes a second pawl, the first strap lock portion includes a plurality of first serrations, and the second strap lock portion includes a plurality of second serrations.

In some aspects, the techniques and apparatuses described herein relate to a bi-directional buttonhead tie, wherein the first pawl is connected to the locking head at a first hinged connection on the first proximal side, wherein the second pawl is connected to the locking head at a second hinged connection on the second proximal side, wherein the first pawl includes first pawl teeth configured to engage the plurality of the second serrations on the tie strap when the portion of the tie strap is disposed within the first slot, and wherein the second pawl includes second pawl teeth configured to engage the plurality of the first serrations on the tie strap when the portion of the tie strap is disposed within the second slot.

In some aspects, the techniques and apparatuses described herein relate to a bi-directional buttonhead tie, wherein the first pawl is connected to the locking head at a first hinged connection on the first distal side, wherein the second pawl is connected to the locking head at a second hinged connection on the second distal side, wherein the first pawl includes first pawl teeth configured to engage the plurality of the first serrations on the tie strap when the portion of the tie strap is disposed within the first slot, and wherein the second pawl includes second pawl teeth configured to engage the plurality of the second serrations on the tie strap when the portion of the tie strap is disposed within the second slot.

In some aspects, the techniques and apparatuses described herein relate to a bi-directional buttonhead tie, wherein the first strap lock portion includes a plurality of first serrations and wherein the second strap lock portion includes a plurality of second serrations, wherein the tie strap further includes a transition zone positioned adjacent the locking head; the transition zone having a first width; and an engagement zone spaced apart from the locking head and connecting to the transition zone, the first and second serrations defined in the engagement zone, the engagement zone having a second width, and the first width is wider than the second width.

In some aspects, the techniques and apparatuses described herein relate to a bi-directional buttonhead tie, wherein the tie strap is centered on the locking head.

In some aspects, the techniques and apparatuses described herein relate to a bi-directional buttonhead tie, further including a protection flange extending from the panel side of the locking head, the protection flange configured for receipt into an aperture defined in a support structure.

In some aspects, the techniques and apparatuses described herein relate to a bi-directional buttonhead tie including: a tie strap, the tie strap including a first side with a first strap lock portion and a second side with a second strap lock portion; and a locking head, the locking head including an outer side opposite a panel side, the tie strap extending from the panel side of the locking head in a tie strap plane, the locking head further including: a first slot that extends through the locking head from the outer side to the panel side, the first slot configured to receive a portion of the tie strap therethrough and extending along a first slot plane; a second slot that extends through the locking head from the outer side to the panel side, the second slot configured to receive the portion of the tie strap therethrough and extending along a second slot plane, the second slot plane parallel to the first slot plane, the first and second slot planes parallel to the tie strap plane; a first slot lock portion disposed within the first slot, the first slot lock portion configured to engage at least one of the first strap lock portion or the second strap lock portion when the portion of the tie strap is received within the first slot; and a second slot lock portion disposed within the second slot, the second slot lock portion configured to engage at least one of the first strap lock portion or the second strap lock portion when the portion of the tie strap is received within the second slot.

In some aspects, the techniques and apparatuses described herein relate to a bi-directional buttonhead tie including: a tie strap, the tie strap including a first side with a first strap lock portion and a second side with a second strap lock portion; and a locking head, the locking head including an outer side opposite a panel side, the tie strap extending from the panel side of the locking head in a tie strap plane, the locking head further including: a first slot that extends through the locking head from the outer side to the panel side, the first slot configured to receive a portion of the tie strap therethrough and extending along a first slot plane; a second slot that extends through the locking head from the outer side to the panel side, the second slot configured to receive the portion of the tie strap therethrough and extending along a second slot plane, the second slot plane parallel to the first slot plane, the first and second slot planes parallel to the tie strap plane; a first slot lock portion disposed within the first slot, the first slot lock portion configured to engage at least one of the first strap lock portion or the second strap lock portion when the portion of the tie strap is received within the first slot; a second slot lock portion disposed within the second slot, the second slot lock portion configured to engage at least one of the first strap lock portion or the second strap lock portion when the portion of the tie strap is received within the second slot, wherein the panel side of the locking head defines a head plane, and wherein the tie strap extends from the panel side of the locking head perpendicular to the head plane.

In some aspects, the techniques and apparatuses described herein relate to a bi-directional buttonhead tie, including: a tie strap, the tie strap including a first side with a first strap lock portion and a second side with a second strap lock portion; and a locking head, the locking head including an outer side opposite a panel side, the tie strap extending from the panel side of the locking head in a tie strap plane, the locking head further including: a first slot that extends through the locking head from the outer side to the panel side, the first slot configured to receive a portion of the tie strap therethrough and extending along a first slot plane; a second slot that extends through the locking head from the outer side to the panel side, the second slot configured to receive the portion of the tie strap therethrough and extending along a second slot plane, the second slot plane parallel to the first slot plane, the first and second slot planes parallel to the tie strap plane; a first slot lock portion disposed within the first slot, the first slot lock portion configured to engage at least one of the first strap lock portion or the second strap lock portion when the portion of the tie strap is received within the first slot; a second slot lock portion disposed within the second slot, the second slot lock portion configured to engage at least one of the first strap lock portion or the second strap lock portion when the portion of the tie strap is received within the second slot, wherein the tie strap is integrally formed with the locking head, and wherein the tie strap and the locking head are formed of a polymeric material.

In some aspects, the techniques and apparatuses described herein relate to a bi-directional buttonhead tie including: a tie strap, the tie strap including a first side with a first strap lock portion and a second side with a second strap lock portion; and a locking head, the locking head including an outer side opposite a panel side, the tie strap extending from the panel side of the locking head in a tie strap plane, the locking head further including: a first slot that extends through the locking head from the outer side to the panel side, the first slot configured to receive a portion of the tie strap therethrough and extending along a first slot plane; a second slot that extends through the locking head from the outer side to the panel side, the second slot configured to receive the portion of the tie strap therethrough and extending along a second slot plane, the second slot plane parallel to the first slot plane, the first and second slot planes parallel to the tie strap plane; a first slot lock portion disposed within the first slot, the first slot lock portion configured to engage at least one of the first strap lock portion or the second strap lock portion when the portion of the tie strap is received within the first slot; a second slot lock portion disposed within the second slot, the second slot lock portion configured to engage at least one of the first strap lock portion or the second strap lock portion when the portion of the tie strap is received within the second slot, wherein the first strap lock portion includes a plurality of first serrations and wherein the second strap lock portion includes a plurality of second serrations, wherein the tie strap further includes: a transition zone positioned adjacent the locking head, the transition zone having a first width; and an engagement zone spaced apart from the locking head and connecting to the transition zone, the first and second serrations defined in the engagement zone, the engagement zone having a second width, and wherein the first width is wider than the second width.

In some aspects, the techniques and apparatuses described herein relate to a bi-directional buttonhead tie, wherein the first slot lock portion includes a first pawl, wherein the second slot lock portion includes a second pawl, wherein the first strap lock portion includes a plurality of first serrations, wherein the second strap lock portion includes a plurality of second serrations, wherein the first pawl includes first pawl teeth configured to engage at least one of the plurality of first or second serrations on the tie strap, and wherein the second pawl includes second pawl teeth configured to engage at least one of the plurality of first or second serrations on the tie strap.

In some aspects, the techniques and apparatuses described herein relate to a bi-directional buttonhead tie including: a tie strap, the tie strap including a first side with a first strap lock portion and a second side with a second strap lock portion; and a locking head, the locking head including an outer side opposite a panel side, the tie strap extending from the panel side of the locking head in a tie strap plane, the locking head further including: a first slot that extends through the locking head from the outer side to the panel side, the first slot configured to receive a portion of the tie strap therethrough and extending along a first slot plane; a second slot that extends through the locking head from the outer side to the panel side, the second slot configured to receive the portion of the tie strap therethrough and extending along a second slot plane, the second slot plane parallel to the first slot plane, the first and second slot planes parallel to the tie strap plane; a first slot lock portion disposed within the first slot, the first slot lock portion configured to engage at least one of the first strap lock portion or the second strap lock portion when the portion of the tie strap is received within the first slot; a second slot lock portion disposed within the second slot, the second slot lock portion configured to engage at least one of the first strap lock portion or the second strap lock portion when the portion of the tie strap is received within the second slot, further including a protection flange extending from the panel side of the locking head, the protection flange configured for receipt into an aperture defined in a support structure.

This Summary is provided to introduce simplified concepts for techniques and apparatuses for improved bi-directional buttonhead ties, which are further described below in the Detailed Description and are illustrated in the Drawings. This Summary is intended neither to identify essential features of the claimed subject matter nor for use in determining the scope of the claimed subject matter.

BRIEF DESCRIPTION OF THE DRAWINGS

The details of one or more aspects of techniques and apparatuses for improved bi-directional buttonhead ties are described with reference to the following Drawings, in which use of the same numbers in different instances may indicate like features and/or components.

FIG. 4 is a perspective view of a fourth example bi-directional buttonhead tie.

FIG. 4A is a cross-sectional view along lines 4A-4A in FIG. 4.

FIG. 5 is a head end view of the bi-directional buttonhead tie of FIG. 4.

FIG. 6 is a tail end view of the bi-directional buttonhead tie of FIG. 4.

DETAILED DESCRIPTION

Overview

This document describes techniques and apparatuses for improved bi-directional buttonhead ties. The improved bi-directional buttonhead ties include a locking head (e.g., "buttonhead") and a tie strap. The locking head may be rigid and the tie strap may be elongated and flexible. In aspects, the buttonhead and tie strap are molded together as a single-molded part. The buttonhead includes at least one locking mechanism configured for lockingly engaging serrated teeth defined on at least one side of the tie strap. The locking mechanism may include at least one slot configured for receiving a tail end of the tie strap therethrough. The disclosed bi-directional buttonhead ties permit elongated articles (e.g., wires, harnesses, hoses, tubes, cables, and the like) to be secured in a bundle and attached to a support structure (e.g., a vehicle chassis, a vehicle panel, a vehicle frame rail, a firewall, a fender, a body panel, a bracket, a mounting surface, or the like).

In aspects, a bi-directional buttonhead tie includes at least one tie strap configured for insertion through an orifice defined through a support structure and through a slot (e.g., channel, passageway, orifice) defined in a locking head of the bi-directional buttonhead tie to form a loop (e.g., a loop around a bundle of elongated articles).

Aspects of the present disclosure address technical problems associated with buttonhead ties and, in particular, may decrease manufacturing costs associated with injection molded bi-directional buttonhead ties, may decrease assembly labor and costs during packaging and/or shipping, may improve ease of installation, and may decrease installation errors.

Figure 1A:
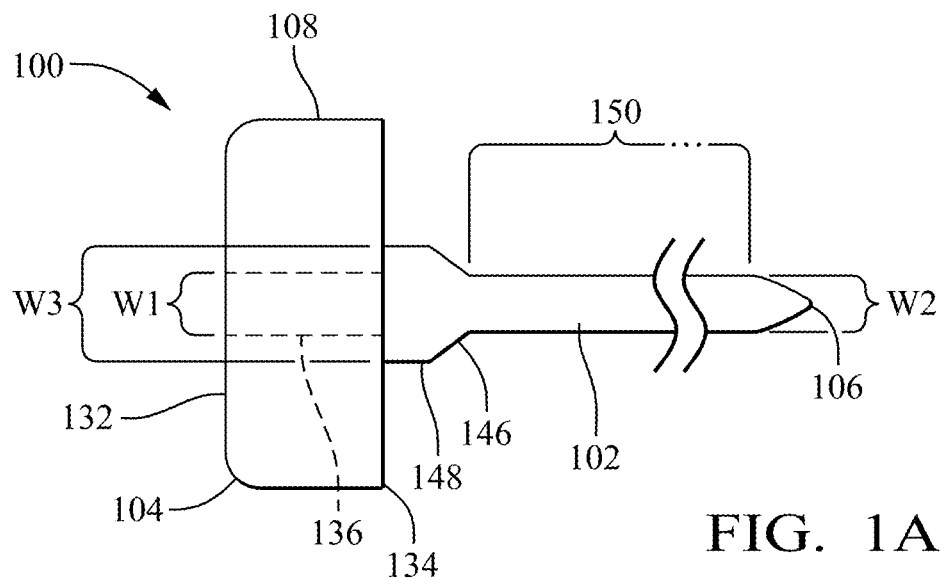
FIG. 1A is a planar view of a first example bi-directional buttonhead tie.
Figure 1B:
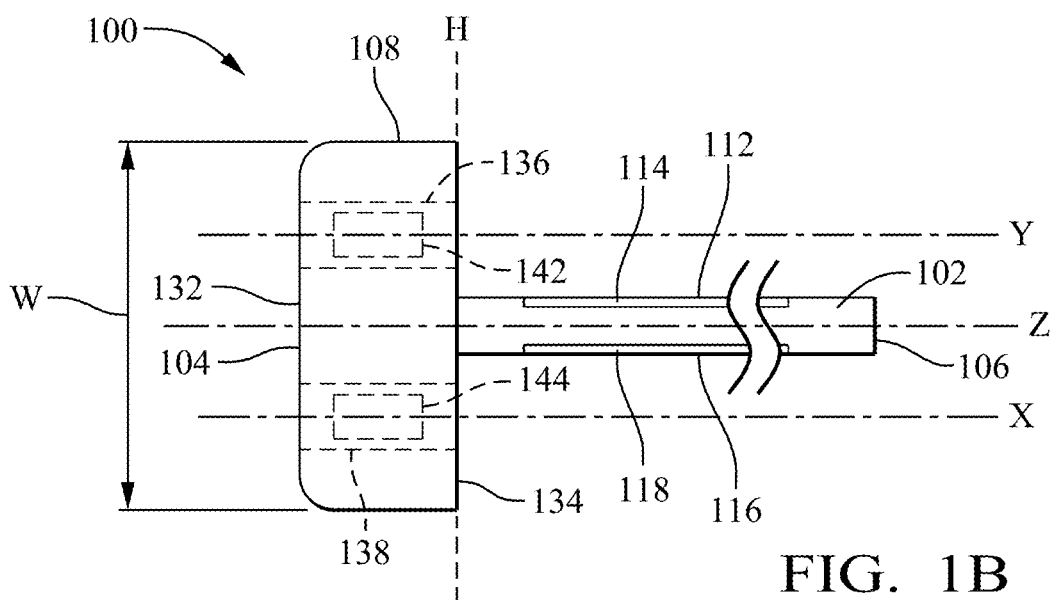
FIG. 1B is a first elevation view of the bi-directional buttonhead tie of FIG. 1A.
Figure 1C:
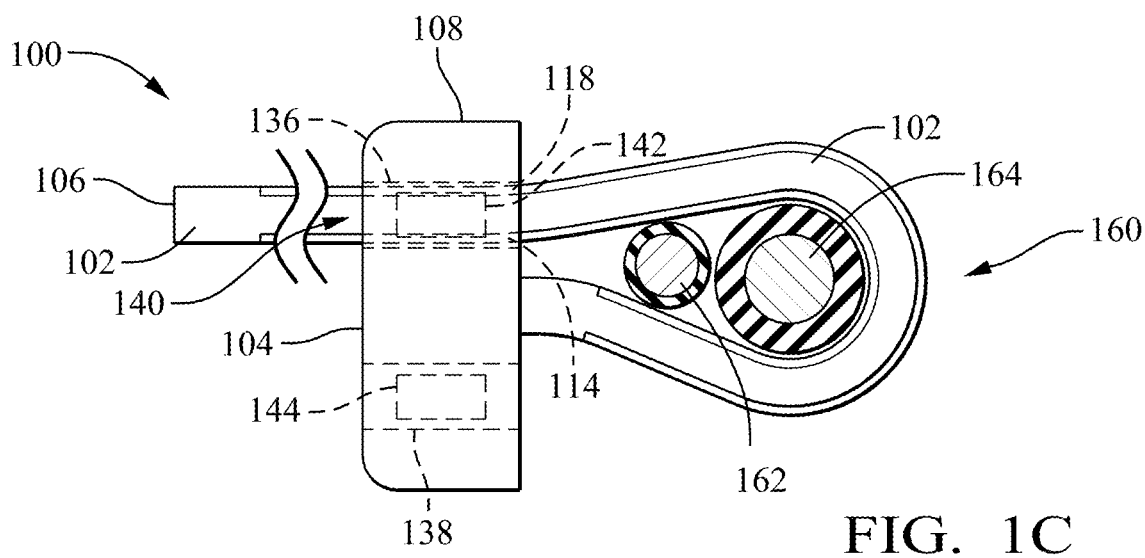
FIG. 1C is a second elevation view of the bi-directional buttonhead tie of FIG. 1A.

FIGS. 1A-1C are schematic illustrations of a first example bi-directional buttonhead tie 100. FIG. 1A is a top, planar view of the bi-directional buttonhead tie 100, and FIG. 1B is a first, side elevation view of the bi-directional buttonhead tie 100. FIG. 1C is a second, side elevation view of the bi-directional buttonhead tie 100, which illustrates the bi-directional buttonhead tie 100 engaging a bundle 160 including a first elongated article 162 and a second elongated article 164. For simplicity, in the schematic illustration of FIG. 1C, a support structure and support structure orifice through which a tie strap 102 extends are not illustrated.

The bi-directional buttonhead tie 100 includes a head end 104 opposite a tail end 106. The head end 104 includes a locking head 108 and the tail end 106 includes the tie strap 102, which extends from the locking head 108. The locking head 108 and the tie strap 102 are connected to one another. In aspects, the locking head 108 and the tie strap 102 are integrally formed together (e.g., as a single part). For example, the bi-directional buttonhead tie 100 may be injection molded, with the locking head 108 and the tie strap 102 integrally formed as a single molded part through injection molding.

FIGS. 1A-1C illustrate the locking head 108 having an outer side 132 and a panel side 134, with a first slot 136 and a second slot 138 defined therebetween. In such a configuration, the first slot 136 extends through the locking head 108 and the second slot 138 extends through the locking head 108.

The tail end 106 is configured for insertion through a support structure orifice (e.g., hole, aperture) defined in a support structure. The support structure orifice and support structure are not illustrated in FIGS. 1A-1C but are illustrated with respect to aspects of FIGS. 2 and 3. After passing through the support structure orifice, the tail end 106 of the tie strap 102 is then looped around at least one of the elongated article(s) to form the bundle 160, as illustrated in FIG. 1C. The term "bundle" used herein refers to any article or articles that may be secured by a bi-directional buttonhead tie. Common examples of a bundle, which is securable via an example bi-directional buttonhead tie, include one or more bundles of wires, cables, lines, hoses, tubing, conduit, or other objects (e.g., elongated articles) that need securing. Additional example implementations of securing a bundle include securing vines to trellises, small trees to stakes, animal fencing to poles, etc.

After looping around at least one of the elongated article(s) to form the bundle 160, the tail end 106 is then passed back through the support structure orifice (illustrated in FIGS. 2 and 3) and through the first slot 136 or the second slot 138 of the locking head 108.

FIG. 1A illustrates the first slot 136 having a slot width (w1) and the tie strap 102 having a strap width (w2) that is less than the slot width (w1). In this way, the first slot 136 is sized to receive a portion of the tie strap 102 therethrough. While not illustrated in FIG. 1A, the slot width of the second slot 138 may be similar in width to the slot width (w1) of the first slot 136. In this way, the second slot 138 is also sized to receive a portion of the tie strap 102 therethrough.

Figure 2:
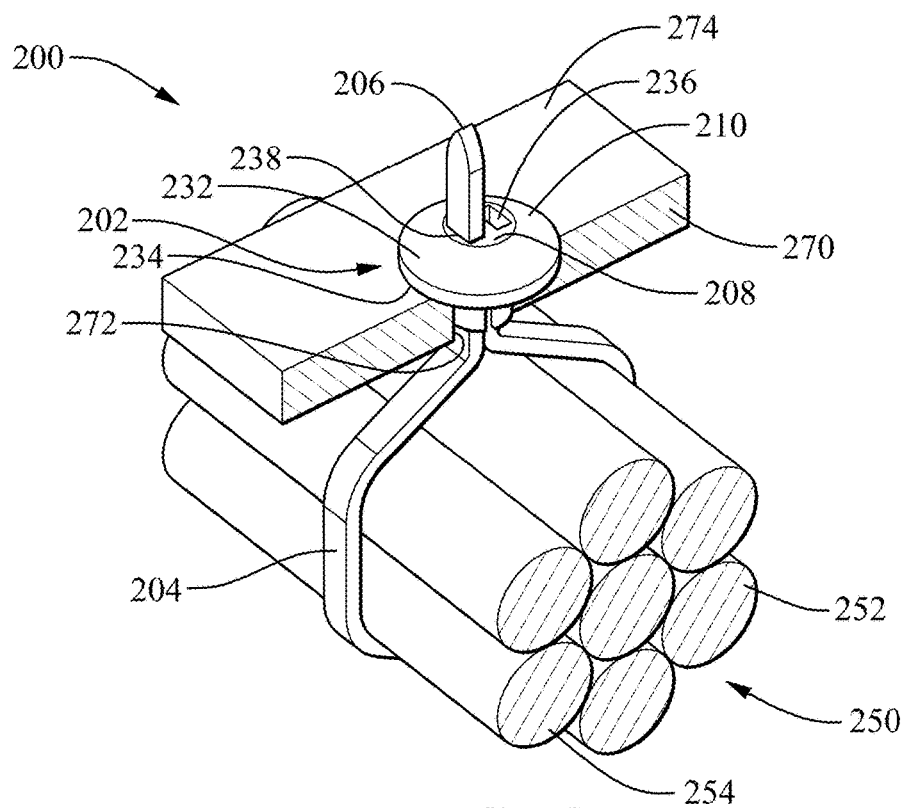
FIG. 2 is a partial, perspective view of a first system that includes a second example bi-directional buttonhead tie, a support structure, and a bundle of elongated articles.
Figure 3:
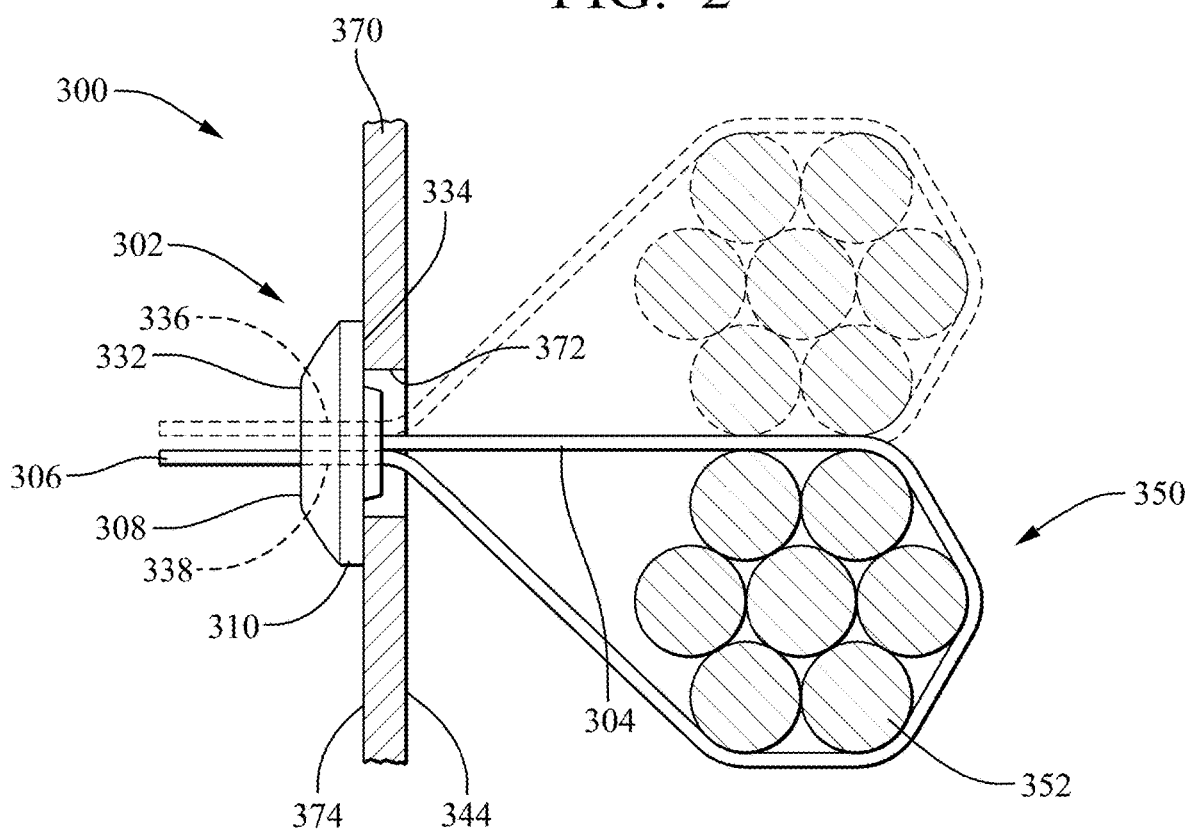
FIG. 3 is a partial, elevation view of a second system that includes a third example bi-directional buttonhead tie, a support structure, and a bundle including an elongated article.

The first slot 136 and the second slot 138 are each configured to receive the tail end 106 of the tie strap 102 therethrough. In this way, the tie strap 102 of the bi-directional buttonhead tie 100 is "bi-directional"—able to be inserted through the orifice defined through the support structure and looped around one or more elongated articles in a first direction (e.g., clockwise) or in a second direction (e.g., counter-clockwise), and connected through the first slot 136 or the second slot 138 to the locking head 108 to form a bundle, as illustrated in FIG. 2 and FIG. 3 described below. In this way, an installer can select a loop direction to utilize that is ergonomic and, without looking at the outer side 132 of the bi-directional buttonhead tie 100, confirm strap engagement.

In aspects, the bi-directional buttonhead tie 100 includes strap lock portions (e.g., first strap lock portion 114, second strap lock portion 118) that are on two sides (e.g., first side 112, second side 116) of the tie strap 102, and the locking head 108 includes a first slot lock portion 142 associated with the first slot 136 and a second slot lock portion 144 associated with the second slot 138. In aspects, the slot lock portions 142 and 144 include a pawl (e.g., a toothed pawl). The pawl may be positioned internally to the locking head 108.

The slot lock portions 142 and 144 are configured for lockingly engaging the strap lock portion(s) (e.g., first strap lock portion 114, second strap lock portion 118) defined on the side(s) (e.g., first side 112, second side 116) of the tie strap 102. This allows the tie strap 102 to be inserted and fed through either the first slot 136 or the second slot 138 for engagement and bundling, which makes assembly faster and easier.

The bi-directional buttonhead tie 100 includes at least one locking mechanism configured for locking the tie strap 102 within the slot(s) (e.g., first slot 136, second slot 138) defined in the locking head 108. The locking mechanism may be defined on one or both of the tie strap 102 and the locking head 108. In the schematic illustrations of FIGS. 1A-1C, the locking mechanism (e.g., first locking mechanism 140) includes one or more of the first slot lock portion 142, the second slot lock portion 144, the first strap lock portion 114, and the second strap lock portion 118. In one example, the first slot lock portion 142 and the second slot lock portion 144 include pawl assemblies having hinged pawls with teeth, and the first strap lock portion 114 and the second strap lock portion 118 include serrations on them configured for engaging the pawl teeth. In the aspect of FIG. 1C, the tie strap 102 can be locked to the locking head 108 through the first slot lock portion 142 engaging with one or both of the first strap lock portion 114 and the second strap lock portion 118.

The locking mechanism (e.g., first locking mechanism 140) may be releasable, enabling a tie strap 102 that is locked within the locking head 108 to be unlocked from engagement with the locking head 108 and detached therefrom. For example, the locking head 108 may include a release feature (not illustrated) configured to permit a pawl mechanism to be released from engagement with the serrations of the strap, thereby enabling the pawl-latching device to be removed from securing the bundle. The release feature (e.g., unlocking tab, unlocking lever) may be configured to enable an operator to digitally manipulate (e.g., utilizing a finger of the operator, utilizing a tool) the release feature to disengage the pawl teeth on the pawl from engagement with the serrations. Disengagement of the pawl teeth from the serrations permits the tie strap 102 to be withdrawn from the locking head 108 and the pawl-latching device to be removed from securing the bundle. In aspects, the locking mechanism (e.g., first locking mechanism 140) may include a tab or another structure extending from the pawl configured for manipulation by an installer's finger or a tool to facilitate release of the pawl from its engagement with the serrations of the tie strap 102.

The bi-directional buttonhead tie 100 includes the first locking mechanism 140 configured for locking the tie strap 102 within the first slot 136 (as illustrated in FIG. 1C) and a second locking mechanism (not illustrated in FIGS. 1A-1C) configured for locking the tie strap 102 within the second slot 138. The locking mechanisms (e.g., first locking mechanism 140, second locking mechanism) may include at least one of the first strap lock portion 114 (e.g., plurality of serrations) or the second strap lock portion 118 (e.g., plurality of serrations) on the tie strap 102 and at least one serration engaging mechanism (e.g., pawl assembly, slot lock portion, toothed pawl) located in the respective slot (e.g., first slot 136, second slot 138). In aspects, a geometry design of a locking mechanism may include one or more core out portions.

In the aspect illustrated in FIGS. 1A-1C, the first locking mechanism 140 may include the first strap lock portion 114 on the tie strap 102, the second strap lock portion 118 on the tie strap 102, the first slot lock portion 142 located in the first slot 136, and the second slot lock portion 144 located in the second slot 138. The first slot lock portion 142 and the second slot lock portion 144 allow the tie strap 102 to be retained inside the locking head 108 along the length of the tie strap 102. This allows the installer to loosely bundle the bi-directional buttonhead tie 100 in a loop around the elongated article(s) without the bundle separating prior to final tensioning.

The first strap lock portion 114 may include a plurality of first serrations on the first side 112 of the tie strap 102, and the second strap lock portion 118 may include a plurality of second serrations on the second side 116 of the tie strap 102. The first serrations and/or the second serrations may be configured to engage the first slot lock portion 142 and/or the second slot lock portion 144.

When the tail end 106 is passed through the first slot 136, the first slot lock portion 142 in the first slot 136 engages at least one of the first strap lock portion 114 or the second strap lock portion 118 on the tie strap 102, and the tie strap 102 is thereby locked onto the locking head 108. Likewise, when the tail end 106 is passed through the second slot 138, the second slot lock portion 144 engages at least one of the second strap lock portion 118 or the first strap lock portion 114 on the tie strap 102, and the tie strap 102 is thereby locked onto the locking head 108. In such a configuration, the locking head 108, in turn, can extend into and bear against the support structure at or adjacent to the support structure aperture, as illustrated in FIG. 2 and FIG. 3.

A slot (e.g., first slot 136, second slot 138) may include one or more interior sidewall surfaces. A slot lock portion (e.g., first slot lock portion 142, second slot lock portion 144) in the slot may include a pawl that is hingedly connected to at least one sidewall surface of the slot (e.g., first slot 136, second slot 138). The first slot lock portion 142 may include pawl teeth of a pawl assembly (not illustrated in FIGS. 1A-1C) located in the first slot 136, and the second slot lock portion 144 may include pawl teeth of a pawl assembly (not illustrated in FIGS. 1A-1C) located in the second slot 138.

In such a configuration, the pawl teeth are configured to engage the strap lock portions (e.g., first strap lock portion 114, second strap lock portion 118) on the tie strap 102. The serrations may include structural flats on a top edge of the serrations (e.g., on major tooth profiles). In aspects, the flats may make the serrations trapezoidal in shape. In this way, loop tensile strength and retention under load may be improved. Further, the flats may improve plastic filling of the tie strap 102 during injection molding processes. Serrations on one side (e.g., first side 112) of a tie strap may be aligned with or spaced (e.g., staggered one-half pitch or another fraction) relative to serrations on a second side (e.g., second side 116) of a tie strap to increase a maximum cross-section area of the tie strap. In this way, the plastic filling of the tie strap during a molding process may be improved and loop tensile/retention strength of an assembled buttonhead tie may be increased.

The tie strap 102 may be dual-sided. In aspects, the tie strap 102 includes the first side 112 with the first strap lock portion 114 and the second side 116 with the second strap lock portion 118. In aspects, the tie strap 102 extends axially from the locking head 108. The tie strap 102 may be generally centered on a width (w) of the locking head 108, as illustrated in FIG. 1B.

As illustrated in FIGS. 1A-1C, the tail end 106 may be laterally and/or longitudinally tapered to facilitate ergonomic starting strap insertion. The width of the tie strap 102 may be longitudinally tapered between the tail end 106 and the connection between the tie strap 102 and the locking head 108. For example, the tie strap 102 may include a ramp portion 146 from an engagement zone 150 to a transition zone 148. The engagement zone 150 is configured for receipt into a slot (e.g., first slot 136, second slot 138) and for engaging a respective lock portion (e.g., first slot lock portion 142, second slot lock portion 144).

A length of the taper (e.g., ramp portion 146) may vary between aspects. In some aspects, the taper is long, whereas in other aspects the taper is short. In some aspects, there is no transition zone and the width (w2) of the tie strap 102 is the same from the junction with the locking head 108 through a substantial portion of a length of the tie strap 102.

In the aspect illustrated in FIG. 1A, the transition zone 148 has a transition width (w3) that is greater than the strap width (w2) and the slot width (w1). In this way, the transition zone 148 is configured as a guide (e.g., runway, landing) that makes it easier for the installer to digitally manipulate a tip of the tie strap 102 to insert it into the slot (e.g., first slot 136, second slot 138) when the installer is unable to visually confirm an orientation and placement of the same. The transition zone 148 may also improve a robustness and longevity of mold tool steel conditions that form the first slot 136 and/or second slot 138 in the locking head 108.

In the aspect illustrated in FIG. 1A, the transition zone 148 is wider at the connection of the tie strap 102 to the locking head 108. In this way, an attachment surface area between the tie strap 102 and the locking head 108 is increased, which adds reinforcement strength for high-tension looped bundle loading applications as higher strap tension may be applied to the tie strap 102 during tightening the bundle against the support structure (e.g., chassis), forcing a transition between the tie strap 102 and the locking head 108 to bend. Likewise, after installation and when a vehicle on which the bi-directional buttonhead tie 100 is utilized is driving on rough roads and bouncing and jostling around, this high-tension bundle will move independent of the support structure.

Referring now to FIG. 1B, the length of the tie strap 102 defines a Z-axis. The tie strap 102 extends from the panel side 134 of the locking head 108 in a tie strap plane. A length of the first slot 136 defines a Y-axis, and a length of the second slot 138 defines an X-axis. In aspects, at least one of the X-axis, Y-axis, or Z-axis is parallel. The first slot 136 may define a first slot plane that is parallel to the Y-axis, the second slot 138 may define a second slot plane that is parallel to the X-axis, and the panel side 134 of the locking head 108 may define a head plane (H). In aspects, the first and second slot planes are parallel to one another and the head plane is perpendicular to the first and second slot planes. For example, as illustrated in FIG. 3, a locking head 310 is positioned on a first side (e.g., the side of the first surface 374) of a support structure 370 (e.g., panel), a loop of a bundle 350 is on another side of the panel (e.g., the side of a second surface 344), with the support structure 370 therebetween. A tie strap (e.g., tie strap 304) enters a locking head (e.g., locking head 310) generally parallel to the transition zone 148 and generally perpendicular to a bottom face (panel side 334) of a locking head 310.

In aspects, the tie strap 102 may be divided laterally or longitudinally into a first tie strap and a second tie strap, with the first tie strap configured to engage the first strap lock portion 114 or the second strap lock portion 118 and the second tie strap configured to engage the first strap lock portion 114 or the second strap lock portion 118.

The tie strap 102 is configured for insertion through the support structure orifice (not illustrated in FIGS. 1A-1C) and into a slot (e.g., channel, passageway, orifice) defined through the locking head 108 to form a loop (e.g., a loop around a bundle of elongated articles), as illustrated in the aspects of FIG. 2 and FIG. 3 and described below. A disclosed bi-directional buttonhead tie may be utilized in a system that includes a support structure and one or more elongated articles. In such a system, a strap portion of the bi-directional buttonhead tie is configured to be inserted through an orifice defined through the support structure and around the one or more elongated articles and to be connected to a locking head of the bi-directional buttonhead tie to form a bundle. One aspect of such a system is illustrated in FIG. 2, which illustrates a partial, perspective view of a system 200 that includes a bi-directional buttonhead tie 202 that extends through a support structure 270 and loops around a bundle 250 that includes at least one elongated article (e.g., elongated article 252, elongated article 254).

The bi-directional buttonhead tie 202 of FIG. 2 is similar to the bi-directional buttonhead tie 100 of FIGS. 1A-1C and described above, except as detailed below. Thus, the bi-directional buttonhead tie 202 includes a head end 208, a tail end 206, a tie strap 204, a locking head 210. The locking head 210 includes a first slot 236, a second slot 238, an outer side 232, and a panel side 234. In the system 200, the panel side 234 of the locking head 210 is illustrated as abutting a first surface 274 of the support structure 270. The tie strap 204 extends through an orifice 272 defined through the support structure 270, around one or more elongated articles (e.g., elongated article 252, elongated article 254), and back through the second slot 238 to form a bundle 250 that is thereby attached to the support structure 270.

Another aspect of such a system is illustrated in FIG. 3, which is a partial, elevation view of a system 300 including a bi-directional buttonhead tie 302, a support structure 370, and a bundle 350 including at least one elongated article (e.g., elongated article 352). The bi-directional buttonhead tie 302 of FIG. 3 is similar to the bi-directional buttonhead tie 100 of FIGS. 1A-1C and described above, except as detailed below. Thus, the bi-directional buttonhead tie 302 includes a tie strap 304, a tail end 306, a head end 308, and a locking head 310. The locking head 310 includes a first slot 336, a second slot 338, an outer side 332, and a panel side 334. In the system 300, the panel side 334 of the locking head 310 is illustrated as abutting a first surface 374 of the support structure 370. The tie strap 304 extends through an orifice 372 defined through the support structure 370, around at least one elongated article (e.g., elongated article 352), and back through the second slot 338 to form the bundle 350. In this way, the bundle 350 is attached to the support structure 370. Alternatively, as represented by dashed lines in FIG. 3, the tie strap 304 may be extended through the orifice 372 defined through the support structure 370, around the at least one elongated article 352, and back through the first slot 336 to form the bundle 350. In this way, the tie strap 304 is bi-directional.

FIGS. 4, 4A, 5, 6, and 7 illustrate another aspect of a bi-directional buttonhead tie 400. The bi-directional buttonhead tie 400 is similar to the bi-directional buttonhead tie 100 of FIGS. 1A-1C and described above, except as detailed below. Thus, the bi-directional buttonhead tie 400 includes a tie strap 404, a tail end 406, a head end 408, a locking head 410, a first side 412, a second side 418, a first lock mechanism, a second lock mechanism, a first strap lock portion 414, a first slot lock portion 542, a second strap lock portion 718, a second slot lock portion 544, an outer side 532, a panel side 434, a first slot 536, a second slot 538, an X-axis, a Y-axis, a Z-axis, a tie strap plane, a first slot plane, a second slot plane, a ramp portion 446, a transition zone 448, and an engagement zone 450. The tie strap 404 is configured for insertion through a support structure orifice (not illustrated in FIGS. 4-7) and into a slot (e.g., first slot 536, second slot 538) defined through the locking head 410 to form a loop (e.g., a loop around a bundle of elongated articles), as illustrated in the aspects of FIG. 2 and FIG. 3 and described above.

The bi-directional buttonhead tie 400 includes a first locking mechanism and a second locking mechanism. The locking mechanisms are configured for locking the tie strap 404 within at least one of the first slot 536 or the second slot 538 after the tie strap 404 has been inserted through the orifice defined through the support structure and back through the first slot 536 or the second slot 538 to form a loop (e.g., a loop around a bundle of elongated articles as illustrated in FIGS. 2 and 3). The first locking mechanism includes at least one strap lock portion (e.g., the first strap lock portion 414, the second strap lock portion 718) and the first slot lock portion 542 located in the first slot 536. The second locking mechanism includes at least one strap lock portion (e.g., the first strap lock portion 414, the second strap lock portion 718) and the second slot lock portion 544 located in the second slot 538. The strap lock portions 414 and 718 are configured to engage the respective slot lock portions 542 and 544 to retain the tie strap 404 relative to the locking head 410.

Figure 7:
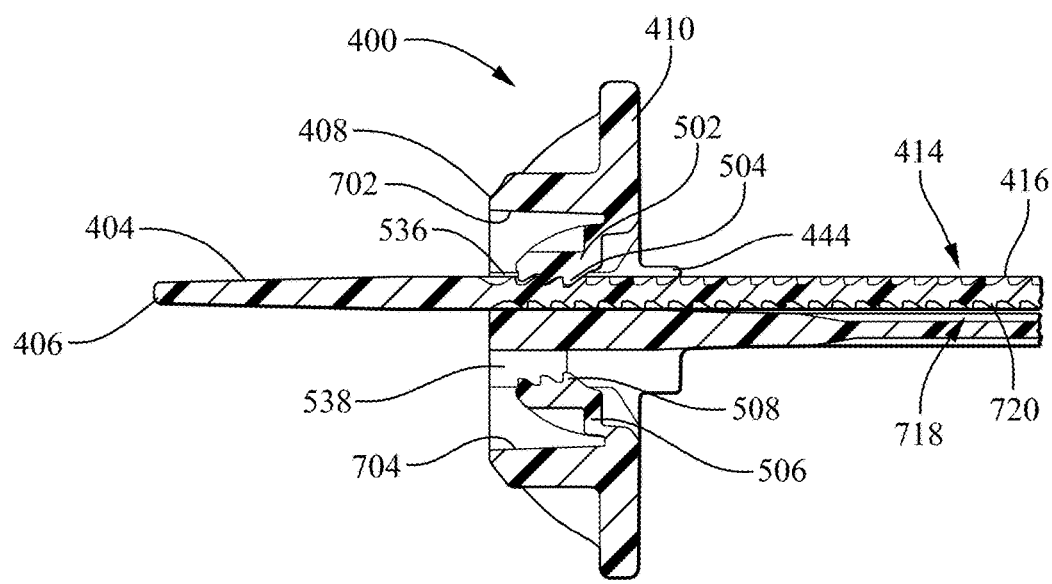
FIG. 7 is a cross-sectional view of the bi-directional buttonhead tie of FIG. 4 along lines 7-7 in FIG. 5.
Figure 8:
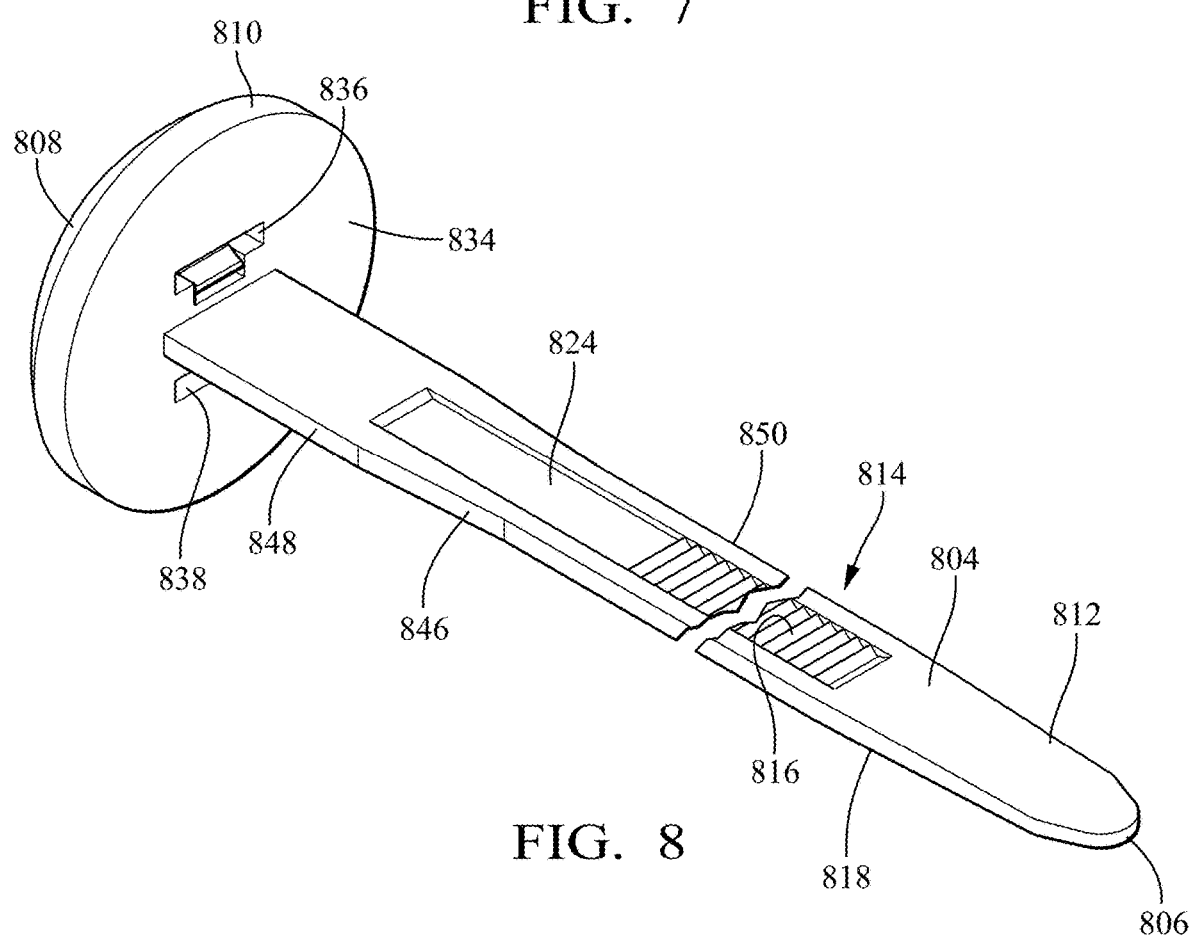
FIG. 8 is a perspective view of a fifth example bi-directional buttonhead tie.
Figure 9:
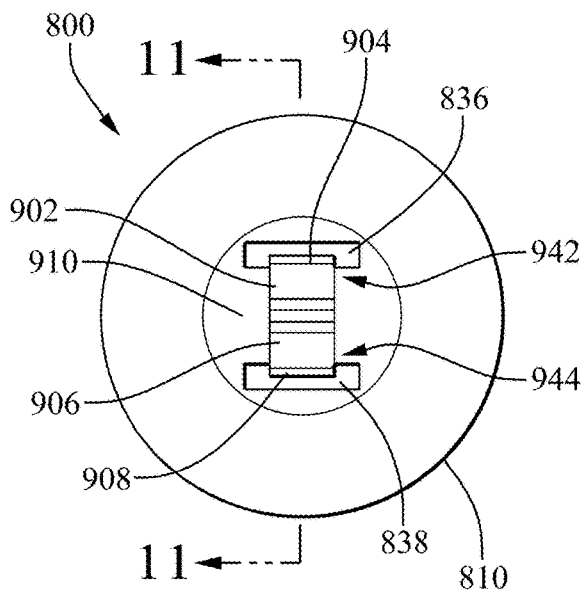
FIG. 9 is a head end view of the bi-directional buttonhead tie of FIG. 8.
Figure 10:
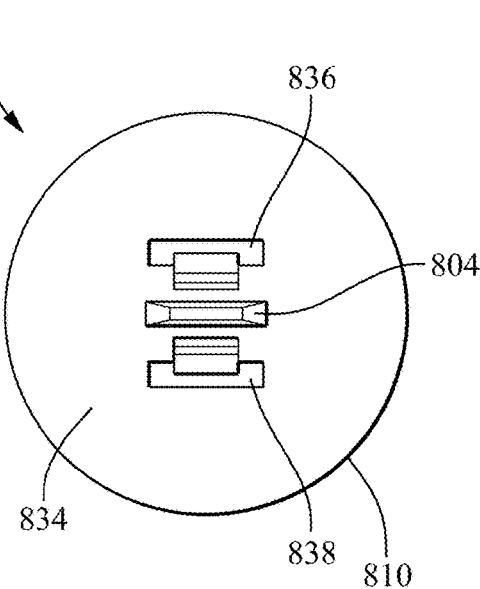
FIG. 10 is a tail end view of the bi-directional buttonhead tie of FIG. 8.
Figure 11:
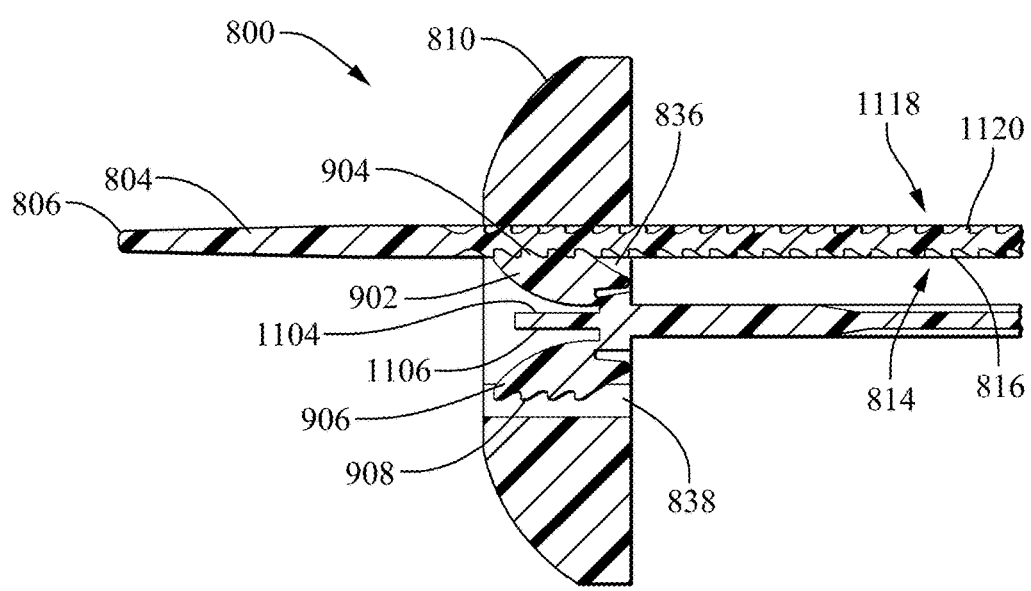
FIG. 11 is a cross-sectional view of the bi-directional buttonhead tie of FIG. 8 along lines 11-11 in FIG. 9.

A strap lock portion (e.g., the first strap lock portion 414, the second strap lock portion 718) may include a plurality of serrations located on the tie strap 404. In the aspect illustrated in FIGS. 4 and 7, the serrations include first serrations 416 located on the first side 412 (e.g., first lengthwise side) of the tie strap 404 and second serrations 720 located on the second side 418 (e.g., second lengthwise side) of the tie strap 404. In aspects, the serrations extend widthwise. The first serrations 416 and the second serrations 720 on opposing sides may be aligned relative to one another, as illustrated in FIG. 7, or may be aligned offset from one another (not illustrated). The first serrations 416 and/or the second serrations 720 may be configured to engage a slot lock portion (e.g., the first slot lock portion 542 and/or the second slot lock portion 544).

A slot lock portion may include a pawl assembly (e.g., first pawl assembly 502, second pawl assembly 506) having at least one serration-engaging mechanism (e.g., first toothed pawl 504, second toothed pawl 508) configured for engaging the serrations located on the tie strap 404. A serration-engaging mechanism may be configured for engaging serrations located on either side of the tie strap 404. A toothed pawl (e.g., first toothed pawl 504, second toothed pawl 508) may include one or more pawl teeth. For example, the aspect illustrated in FIG. 7 shows three pawl teeth on each toothed pawl. The pawl teeth face a respective slot (e.g., first slot 536, second slot 538) and include protrusions extending from the toothed pawl into or toward the slot. The pawl teeth may be angled toward one end of the slot. The pawl teeth may be configured to engage the plurality of serrations on the tail end 406 of the tie strap 404 when a portion of the tail end 406 of the tie strap 404 is disposed within the first slot 536. In aspects, the serrations are engaged by the pawl teeth when the tie strap 404 is inserted into the slot.

In aspects, the pawl assembly (e.g., first pawl assembly 502, second pawl assembly 506) is located in a slot (e.g., first slot 536, second slot 538) that extends through the locking head 410. The slot may include one or more interior sidewall surfaces. In the aspect illustrated in FIGS. 4, 4A, 5, 6, and 7, the first slot 536 includes a first distal side wall 702 (distal to the centerline Z-axis of the bi-directional buttonhead tie 400) and the second slot 538 includes a second distal side wall 704. In this aspect, the first pawl assembly 502 is a hinged retention pawl that hingedly attaches to the locking head 410 at the first distal side wall 702, and the second pawl assembly 506 is a hinged retention pawl that hingedly attaches to the locking head 410 at the second distal side wall 704.

In the aspect illustrated in FIGS. 4-7, the first toothed pawl 504 of the first pawl assembly 502 and the second toothed pawl 508 of the second pawl assembly 506 face the centerline of the locking head 410. In other aspects (e.g., the aspect illustrated in FIGS. 8-11 and discussed below), the first toothed pawl of the first pawl assembly and the second toothed pawl of the second pawl assembly may face away from the centerline of the locking head. In other aspects, the first pawl of the first pawl assembly may face the centerline of the locking head and the second pawl of the second pawl assembly may face away from the centerline of the locking head, or vice versa. In aspects, the slot lock portions include a pawl (e.g., a toothed pawl). The pawl may be positioned internally to the locking head.

The first pawl assembly 502 is disposed within the first slot 536 such that, when the tie strap 404 is disposed within the first slot 536, the first pawl assembly 502 engages the first serrations 416 or the second serrations 720 to allow unidirectional movement of the tie strap 404 through the first slot 536 in a first direction and resist movement of the tie strap 404 in an opposite direction. In the aspect illustrated in FIGS. 4-7, the first pawl assembly 502 is configured to engage the first serrations 416.

The second pawl assembly 506 is disposed within the second slot 538 such that, when the tie strap 404 is disposed within the second slot 538, the second pawl assembly 506 engages the first serrations 416 or the second serrations 720 to allow unidirectional movement of the tie strap 404 through the second slot 538 in a first direction and resist movement of the tie strap 404 in an opposite direction. In the aspect illustrated in FIGS. 4-7, the second pawl assembly 506 is configured to engage the second serrations 720.

A width of the tie strap 404 may taper between the tail end 406 and a connection between the tie strap 404 and the locking head 410. For example, the tie strap 404 may include the ramp portion 446 from the engagement zone 450 to the transition zone 448. The engagement zone 450 is configured for receipt into the slot (e.g., first slot 536, second slot 538) and for engaging a respective slot lock portion (e.g., first slot lock portion 542, second slot lock portion 544). In the aspect illustrated in FIGS. 4-7, the transition zone 448 has a transition width that is greater than the strap width and a slot width. In this way, the transition zone 448 is configured as a guide (e.g., runway, landing) that makes it easier for an installer to digitally manipulate a tip of the tie strap 404 to insert it into the slot (e.g., first slot 536, second slot 538) when the installer is unable to visually confirm an orientation and placement of the same. The transition zone 448 may also improve the robustness and longevity of mold tool steel conditions that form the first slot 536 and/or second slot 538 in the locking head 410. Further in this way, an attachment surface area between the tie strap 404 and the locking head 410 is increased, which adds reinforcement strength for high-tension looped bundle loading applications as higher strap tension is applied to the tail end 406 during tightening the bundle against a chassis, forcing the transition between the strap 404 and locking head to bend. Likewise, after installation and when a vehicle on which the bi-directional buttonhead tie 400 is utilized is driving on rough roads and bouncing and jostling around, this high-tension bundle will move independent of the chassis. The transition zone 448 may also include sacrificial edges that help keep the tie strap 404 centered within the orifice defined in the support structure (as illustrated in FIGS. 2 and 3) when installed. In this way, during vehicular vibrations and bouncing, any chafing or other damage to the bi-directional buttonhead tie 400 caused by the orifice of the support structure may be limited to the transition zone 448.

FIG. 4A illustrates a cross-sectional view along lines 4A-4A in FIG. 4, which shows that a portion of the engagement zone 450 may be I-shaped in cross-section (e.g., an I-shaped profile). FIG. 4A illustrates the tie strap 404 with the first side 412 opposite the second side 418, the first side 412 including a first groove 424 and the second side 418 including a second groove 426.

The bi-directional buttonhead tie 400 may further include one or more protection flanges (e.g., pilot bushing, standing boss, hole protection flange) on either side (or both sides) of the tie strap 404 that help center the locking head 410 relative to the orifice (e.g., hole) defined through the support structure (e.g., as illustrated in FIGS. 2 and 3). The protection flange(s) may protect the tie strap 404 from edges (e.g., burr edges) of a stamped (or other machined method) orifice, preventing damage (e.g., strap cutting) to the tie strap 404. The protection flanges may extend from the panel side 434 of the locking head 410 and/or from the tie strap 404. A protection flange may be configured for receipt into an aperture defined in a support structure (e.g., as illustrated with respect to FIG. 2 and FIG. 3). In the aspect illustrated in FIGS. 4, 6, and 7, the bi-directional buttonhead tie 400 includes a first protection flange 442 and a second protection flange 444. The first protection flange 442 and the second protection flange 444 may comprise first and second arced portions. In the aspect illustrated in FIGS. 4 and 6, the first and second protection flanges 442 and 444 do not extend all the way around the tie strap 404. In other aspects, one or more protection flanges may extend all the way around the tie strap. A protection flange may further provide the tail end 406 with a lead-in during strap assembly, making it easier for an assembler to insert the tail end 406 into the first slot 536 or the second slot 538 blindly without visually seeing the slot. The protection flange may include an I-shaped profile configured to match a rounded outer surface of a support structure orifice (e.g., orifice 372).

As illustrated in the aspect of FIG. 7, the serrations on the first side 412 of the tie strap 404 may be staggered one-half of a pitch or another fraction relative to the serrations on the second side 418 to increase a maximum cross-section area of the tie strap 404. In this way, plastic filling of the tie strap 404 during a molding process may be improved and loop tensile/retention strength of an assembled buttonhead tie may be increased. In other aspects, the serrations on the first side of the tie strap may be aligned with or in line with the serrations on the second side of the tie strap.

Again, the tie strap 404 is configured for insertion through a support structure orifice (not illustrated in FIGS. 4-7) and into a slot (e.g., channel, passageway, orifice) defined through the locking head 410 to form a loop (e.g., a loop around a bundle of elongated articles), as illustrated in the aspects of FIG. 2 and FIG. 3 and described above. For example, the tie strap 404 of the bi-directional buttonhead tie 400 is configured to extend through an orifice defined through a support structure (illustrated in FIGS. 2 and 3), around at least one elongated article (illustrated in FIGS. 1C, 2, and 3), and back through the second slot 538 to form a bundle. Alternatively, the tie strap 404 may be extended through the orifice defined through the support structure, around the at least one elongated article, and back through the first slot 536 to form the bundle, similarly to the system 300 illustrated in FIG. 3. In this way, the tie strap 404 is bi-directional.

FIGS. 8, 9, 10, and 11 illustrate another aspect of a bi-directional buttonhead tie 800. The bi-directional buttonhead tie 800 is similar to the bi-directional buttonhead tie 100 of FIGS. 1A-1C and FIGS. 4-7 described above, except as detailed below. Thus, the bi-directional buttonhead tie 800 includes a tie strap 804, a tail end 806, a head end 808, a locking head 810, a first side 812, first serrations 816, a second side 818, a first strap lock portion 814, a groove 824, a first slot lock portion 942, a second strap lock portion 1118, second serrations 1120, a second slot lock portion 944, an outer side 910, a panel side 834, a first slot 836, a second slot 838, an X-axis, a Y-axis, a Z-axis, a tie strap plane, a first slot plane, a second slot plane, a ramp portion 846, a transition zone 848, and an engagement zone 850. The tie strap 804 is configured for insertion through a support structure orifice (not illustrated in FIGS. 8-11) and into a slot defined through the locking head 810 to form a loop (e.g., a loop around a bundle of elongated articles), as illustrated in the aspects of FIG. 2 and FIG. 3 and described above. A protection flange (e.g., first protection flange 442, second protection flange 444) is not illustrated with respect to the aspect of FIGS. 8-11 but may be present.

In the aspect illustrated in FIGS. 8-11, a pawl assembly (e.g., first pawl assembly 902, second pawl assembly 906) is located in a slot (e.g., first slot 836, second slot 838) that extends through the locking head 810. The slot may include one or more interior sidewall surfaces. In the aspect illustrated in FIGS. 8-11, the first slot 836 includes a first proximal side wall 1104 (proximal to a centerline Z-axis of the bi-directional buttonhead tie 800) and the second slot 838 includes a second proximal side wall 1106. In this aspect, the first pawl assembly 902 is a hinged retention pawl that hingedly attaches to the locking head 810 at the first proximal side wall 1104 and the second pawl assembly 906 is a hinged retention pawl that hingedly attaches to the locking head 810 at the second proximal side wall 1106. In such a configuration, a first toothed pawl 904 of the first pawl assembly 902 and the second toothed pawl 908 of the second pawl assembly 906 face away from a centerline of the locking head 810. In aspects, the slot lock portions include a pawl (e.g., a toothed pawl). The pawl may be positioned internally to the locking head.

In other aspects (e.g., as illustrated in FIGS. 4-7), the first pawl of the first pawl assembly and the second pawl of the second pawl assembly may face the centerline of the locking head. In other aspects, the first pawl of the first pawl assembly may face the centerline of the locking head and the second pawl of the second pawl assembly may face away from the centerline of the locking head, or vice versa.

Materials

Components of a disclosed bi-directional buttonhead tie may be fabricated of any suitably resilient material, including polymeric material. In aspects, a bi-directional buttonhead tie is formed of a polymeric material. A suitable polymeric material may include one or more of polyamide, polyamide 6.6, nylon 6, nylon, polypropylene, and polyphenylene sulfide (PPS).

Example Methods

Also disclosed are techniques (e.g., methods) relating to improved bi-directional buttonhead ties. Operations (or steps) of a technique may include one or more operations that may be performed in, but are not necessarily limited to, the order or combinations described herein. Further, any of one or more of the operations may be repeated, combined, or reorganized to provide other operations utilizing example techniques of this disclosure.

The disclosed techniques include methods of manufacturing a bi-directional buttonhead tie (as described above). In an aspect, a method of manufacturing a bi-directional buttonhead tie includes molding a bi-directional buttonhead tie, the bi-directional buttonhead tie including a tie strap and a locking head. The tie strap may include a first side with a first strap lock portion and a second side with a second strap lock portion. The locking head may include an outer side opposite a panel side, the tie strap extending from the panel side of the locking head. The locking head may further include a first slot that extends through the locking head from the outer side to the panel side, the first slot configured to receive a portion of the tie strap therethrough. The locking head may further include a second slot that extends through the locking head from the outer side to the panel side, the second slot configured to receive a portion of the tie strap therethrough. A first slot lock portion may be disposed within the first slot and configured to engage at least one of the first strap lock portion or the second strap lock portion when the portion of the tie strap is received within the first slot. A second slot lock portion may be disposed within the second slot and configured to engage at least one of the first strap lock portion or the second strap lock portion when the portion of the tie strap is received within the second slot.

The disclosed methods include methods of using a bi-directional buttonhead tie described above. In an aspect, a method of using a bi-directional buttonhead tie includes providing a bi-directional buttonhead tie the bi-directional buttonhead tie including a tie strap and a locking head. The tie strap may include a first side with a first strap lock portion and a second side with a second strap lock portion. The locking head may include an outer side opposite a panel side, the tie strap extending from the panel side of the locking head. The locking head may further include a first slot that extends through the locking head from the outer side to the panel side, the first slot configured to receive a portion of the tie strap therethrough. The locking head may further include a second slot that extends through the locking head from the outer side to the panel side, the second slot configured to receive a portion of the tie strap therethrough. A first slot lock portion may be disposed within the first slot and configured to engage at least one of the first strap lock portion or the second strap lock portion when the portion of the tie strap is received within the first slot. A second slot lock portion may be disposed within the second slot and configured to engage at least one of the first strap lock portion or the second strap lock portion when the portion of the tie strap is received within the second slot. The method further includes an installer positioning a tail end of the bi-directional buttonhead tie through an orifice defined through a support structure, looping the tie strap of the bi-directional buttonhead tie around one or more elongated articles, inserting the tail end into a slot of the locking head, through the locking head, and out an outer side of the locking head, pulling the tie strap therethrough until tensioned to form a loop around the elongated member(s), forming a bundle, and thus securing the elongated member(s) to the support structure by the bi-directional buttonhead tie.

Additional Examples

Some additional examples of bi-directional buttonhead ties are as follows:

Example 1

A bi-directional buttonhead tie comprising: a tie strap, the tie strap including a first side with a first strap lock portion and a second side with a second strap lock portion; and a locking head, the locking head including an outer side opposite a panel side, the tie strap extending from the panel side of the locking head, the locking head further including: a first slot that extends through the locking head from the outer side to the panel side, the first slot configured to receive a portion of the tie strap therethrough; a second slot that extends through the locking head from the outer side to the panel side, the second slot configured to receive the portion of the tie strap therethrough; a first slot lock portion disposed within the first slot, the first slot lock portion configured to engage at least one of the first strap lock portion or the second strap lock portion when the portion of the tie strap is received within the first slot; and a second slot lock portion disposed within the second slot, the second slot lock portion configured to engage at least one of the first strap lock portion or the second strap lock portion when the portion of the tie strap is received within the second slot.

Example 2

The bi-directional buttonhead tie of Example 1, wherein the first slot lock portion comprises a first pawl, wherein the second slot lock portion comprises a second pawl, wherein the first strap lock portion includes a plurality of first serrations, and wherein the second strap lock portion comprises a plurality of second serrations.

Example 3

The bi-directional buttonhead tie of Example 2, wherein the first pawl includes first pawl teeth configured to engage at least one of the plurality of first or second serrations on the tie strap, and wherein the second pawl includes second pawl teeth configured to engage at least one of the plurality of first or second serrations on the tie strap.

Example 4

The bi-directional buttonhead tie of Example 2, wherein the first pawl is positioned internally to the locking head and the second pawl is positioned internally to the locking head.

Example 5

The bi-directional buttonhead tie of Example 1, wherein the tie strap is integrally formed with the locking head, and wherein the tie strap and the locking head are formed of a polymeric material.

Example 6

The bi-directional buttonhead tie of Example 1, wherein the panel side of the locking head defines a head plane, and wherein the tie strap extends from the panel side of the locking head perpendicular to the head plane.

Example 7

The bi-directional buttonhead tie of Example 1, wherein the tie strap extends from the panel side of the locking head in a tie strap plane, wherein the first slot extends along a first slot plane, wherein the second slot extends along a second slot plane, wherein the first slot plane is parallel to the second slot plane, and wherein the first and second slot planes are parallel to the tie strap plane.

Example 8

The bi-directional buttonhead tie of Example 1, wherein the first slot comprises a first proximal side proximal to a centerline of the locking head and a first distal side spaced apart from the first proximal side and the centerline; and wherein the second slot comprises a second proximal side proximal to the centerline of the locking head and a second distal side spaced apart from the second proximal side and the centerline.

Example 9

The bi-directional buttonhead tie of Example 8, wherein the first slot lock portion comprises a first pawl, wherein the second slot lock portion comprises a second pawl, wherein the first strap lock portion includes a plurality of first serrations, and wherein the second strap lock portion comprises a plurality of second serrations.

Example 10

The bi-directional buttonhead tie of Example 9, wherein the first pawl is connected to the locking head at a first hinged connection on the first proximal side, wherein the second pawl is connected to the locking head at a second hinged connection on the second proximal side, wherein the first pawl includes first pawl teeth configured to engage the plurality of the second serrations on the tie strap when the portion of the tie strap is disposed within the first slot, and wherein the second pawl includes second pawl teeth configured to engage the plurality of the first serrations on the tie strap when the portion of the tie strap is disposed within the second slot.

Example 11

The bi-directional buttonhead tie of Example 9, wherein the first pawl is connected to the locking head at a first hinged connection on the first distal side, wherein the second pawl is connected to the locking head at a second hinged connection on the second distal side, wherein the first pawl includes first pawl teeth configured to engage the plurality of the first serrations on the tie strap when the portion of the tie strap is disposed within the first slot, and wherein the second pawl includes second pawl teeth configured to engage the plurality of the second serrations on the tie strap when the portion of the tie strap is disposed within the second slot.

Example 12

The bi-directional buttonhead tie of Example 1, wherein the first strap lock portion includes a plurality of first serrations and wherein the second strap lock portion comprises a plurality of second serrations, wherein the tie strap further comprises: a transition zone positioned adjacent the locking head, the transition zone having a first width; and an engagement zone spaced apart from the locking head and connecting to the transition zone, the first and second serrations defined in the engagement zone, the engagement zone having a second width, and wherein the first width is wider than the second width.

Example 13

The bi-directional buttonhead tie of Example 1, wherein the tie strap is centered on the locking head.

Example 14

The bi-directional buttonhead tie of Example 1, further comprising: a protection flange extending from the panel side of the locking head, the protection flange configured for receipt into an aperture defined in a support structure.

Example 15

A bi-directional buttonhead tie comprising: a tie strap, the tie strap including a first side with a first strap lock portion and a second side with a second strap lock portion; and a locking head, the locking head including an outer side opposite a panel side, the tie strap extending from the panel side of the locking head in a tie strap plane, the locking head further including: a first slot that extends through the locking head from the outer side to the panel side, the first slot configured to receive a portion of the tie strap therethrough, the first slot extending along a first slot plane; a second slot that extends through the locking head from the outer side to the panel side, the second slot configured to receive a portion of the tie strap therethrough, the second slot extending along a second slot plane, the second slot plane parallel to the first slot plane, the first and second slot planes parallel to the tie strap plane; a first slot lock portion disposed within the first slot, the first slot lock portion configured to engage at least one of the first strap lock portion or the second strap lock portion when the portion of the tie strap is received within the first slot; and a second slot lock portion disposed within the second slot, the second slot lock portion configured to engage at least one of the first strap lock portion or the second strap lock portion when the portion of the tie strap is received within the second slot.

Example 16

The bi-directional buttonhead tie of Example 15, wherein the panel side of the locking head defines a head plane, and wherein the tie strap extends from the panel side of the locking head perpendicular to the head plane.

Example 17

The bi-directional buttonhead tie of Example 15, wherein the tie strap is integrally formed with the locking head, and wherein the tie strap and the locking head are formed of a polymeric material.

Example 18

The bi-directional buttonhead tie of Example 15, wherein the first strap lock portion includes a plurality of first serrations and wherein the second strap lock portion comprises a plurality of second serrations, wherein the tie strap further comprises: a transition zone positioned adjacent the locking head, the transition zone having a first width; and an engagement zone spaced apart from the locking head and connecting to the transition zone, the first and second serrations defined in the engagement zone, the engagement zone having a second width, and wherein the first width is wider than the second width.

Example 19

The bi-directional buttonhead tie of Example 15, wherein the first slot lock portion comprises a first pawl, wherein the second slot lock portion comprises a second pawl, wherein the first strap lock portion includes a plurality of first serrations, wherein the second strap lock portion comprises a plurality of second serrations, wherein the first pawl includes first pawl teeth configured to engage at least one of the plurality of first or second serrations on the tie strap, and wherein the second pawl includes second pawl teeth configured to engage at least one of the plurality of first or second serrations on the tie strap.

Example 20

The bi-directional buttonhead tie of Example 15, further comprising: a protection flange extending from the panel side of the locking head, the protection flange configured for receipt into an aperture defined in a support structure.

Example 21

The bi-directional buttonhead tie of Example 1, wherein the first pawl teeth are configured to engage the plurality of first serrations on the tie strap when the tie strap is disposed within the first slot.

Example 22

The bi-directional buttonhead tie of Example 1, wherein the first pawl teeth are configured to engage the plurality of second serrations on the tie strap when the tie strap is disposed within the first slot.

Example 23

The bi-directional buttonhead tie of Example 1, wherein the second pawl teeth are configured to engage the plurality of first serrations on the tie strap when the tie strap is disposed within the second slot.

Example 24

The bi-directional buttonhead tie of Example 1, wherein the second pawl teeth are configured to engage the plurality of second serrations on the tie strap when the tie strap is disposed within the second slot.

CONCLUSION

Although implementations of techniques and apparatuses for improved bi-directional buttonhead ties have been described in language specific to certain features and/or operations, the subject of the appended claims is not necessarily limited to the specific features and/or operations described. Rather, the specific features and/or operations are disclosed as example implementations of techniques and apparatuses for improved bi-directional buttonhead ties.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A buttonhead tie comprising:
a tie strap, the tie strap including a first side with a first strap lock portion and a second side with a second strap lock portion, the first strap lock portion including a plurality of first serrations; and
a locking head, the locking head including an outer side opposite a panel side, the tie strap extending from the panel side of the locking head, the locking head further including:
a first slot that extends through the locking head from the outer side to the panel side, the first slot configured to receive a portion of the tie strap therethrough, the first slot comprising a first proximal side proximal to a centerline of the locking head and a first distal side spaced apart from the first proximal side and the centerline;
a second slot that extends through the locking head from the outer side to the panel side, the second slot configured to receive the portion of the tie strap therethrough;
a first slot lock portion disposed within the first slot, the first slot lock portion configured to engage at least one of the first strap lock portion or the second strap lock portion when the portion of the tie strap is received within the first slot, the first slot lock portion comprising a first pawl connected to the locking head at a first hinged connection on the first proximal side; and
a second slot lock portion disposed within the second slot, the second slot lock portion configured to engage at least one of the first strap lock portion or the second strap lock portion when the portion of the tie strap is received within the second slot.

2. The buttonhead tie of claim 1,
wherein the first slot lock portion comprises a first pawl,
wherein the second slot lock portion comprises a second pawl,
wherein the first strap lock portion includes a plurality of first serrations, and
wherein the second strap lock portion comprises a plurality of second serrations.

3. The buttonhead tie of claim 2,
wherein the first pawl includes first pawl teeth configured to engage at least one of the plurality of first or second serrations on the tie strap, and
wherein the second pawl includes second pawl teeth configured to engage at least one of the plurality of first or second serrations on the tie strap.

4. The buttonhead tie of claim 2, wherein the first pawl is positioned internally to the locking head and the second pawl is positioned internally to the locking head.

5. The buttonhead tie of claim 1,
wherein the tie strap is integrally formed with the locking head, and
wherein the tie strap and the locking head are formed of a polymeric material.

6. The buttonhead tie of claim 1,
wherein the panel side of the locking head defines a head plane, and
wherein the tie strap extends from the panel side of the locking head perpendicular to the head plane.

7. The buttonhead tie of claim 1,
wherein the tie strap extends from the panel side of the locking head in a tie strap plane,
wherein the first slot extends along a first slot plane,
wherein the second slot extends along a second slot plane,
wherein the first slot plane is parallel to the second slot plane, and
wherein the first and second slot planes are parallel to the tie strap plane.

8. The buttonhead tie of claim 1,
wherein the second slot comprises a second proximal side proximal to the centerline of the locking head and a second distal side spaced apart from the second proximal side and the centerline.

9. The buttonhead tie of claim 8,
wherein the second slot lock portion comprises a second pawl, and
wherein the second strap lock portion comprises a plurality of second serrations.

10. The buttonhead tie of claim 9,
wherein the second pawl is connected to the locking head at a second hinged connection on the second proximal side,
wherein the first pawl includes first pawl teeth configured to engage the plurality of the second serrations on the tie strap when the portion of the tie strap is disposed within the first slot, and
wherein the second pawl includes second pawl teeth configured to engage the plurality of the first serrations on the tie strap when the portion of the tie strap is disposed within the second slot.

11. The buttonhead tie of claim 9,
wherein the first pawl is connected to the locking head at a first hinged connection on the first distal side,
wherein the second pawl is connected to the locking head at a second hinged connection on the second distal side,
wherein the first pawl includes first pawl teeth configured to engage the plurality of the first serrations on the tie strap when the portion of the tie strap is disposed within the first slot, and
wherein the second pawl includes second pawl teeth configured to engage the plurality of the second serrations on the tie strap when the portion of the tie strap is disposed within the second slot.

12. The buttonhead tie of claim 1,
wherein the first strap lock portion includes a plurality of first serrations and wherein the second strap lock portion comprises a plurality of second serrations,
wherein the tie strap further comprises:
a transition zone positioned adjacent the locking head, the transition zone having a first width; and
an engagement zone spaced apart from the locking head and connecting to the transition zone, the first and second serrations defined in the engagement zone, the engagement zone having a second width, and
wherein the first width is wider than the second width.

13. The buttonhead tie of claim 1, wherein the tie strap is centered on the locking head.

14. The buttonhead tie of claim 1, further comprising:
a protection flange extending from the panel side of the locking head, the protection flange configured for receipt into an aperture defined in a support structure.

15. A buttonhead tie comprising:
a tie strap, the tie strap including a first side with a first strap lock portion and a second side with a second strap lock portion; and
a locking head, the locking head including an outer side opposite a panel side, the tie strap extends from the panel side of the locking head, the locking head further including:
a first slot that extends through the locking head from the outer side to the panel side, the first slot configured to receive a portion of the tie strap therethrough;
a second slot that extends through the locking head from the outer side to the panel side, the second slot configured to receive the portion of the tie strap therethrough, the second slot spaced apart from the first slot with the tie strap positioned between the first slot and the second slot;
a first slot lock portion disposed within the first slot, the first slot lock portion configured to engage at least one of the first strap lock portion or the second strap lock portion when the portion of the tie strap is received within the first slot; and
a second slot lock portion disposed within the second slot, the second slot lock portion configured to engage at least one of the first strap lock portion or the second strap lock portion when the portion of the tie strap is received within the second slot.

16. The buttonhead tie of claim 15,
wherein the first slot lock portion comprises a first pawl,
wherein the second slot lock portion comprises a second pawl,
wherein the first strap lock portion includes a plurality of first serrations, and
wherein the second strap lock portion comprises a plurality of second serrations.

17. The buttonhead tie of claim 16,
wherein the first pawl includes first pawl teeth configured to engage at least one of the plurality of first or second serrations on the tie strap, and
wherein the second pawl includes second pawl teeth configured to engage at least one of the plurality of first or second serrations on the tie strap.

18. The buttonhead tie of claim 16, wherein the first pawl is positioned internally to the locking head and the second pawl is positioned internally to the locking head.

19. The buttonhead tie of claim 15,
wherein the tie strap is integrally formed with the locking head, and
wherein the tie strap and the locking head are formed of a polymeric material.

20. The buttonhead tie of claim 15,
wherein the panel side of the locking head defines a head plane, and
wherein the tie strap extends from the panel side of the locking head perpendicular to the head plane.

* * * * *